United States Patent [19]

Bulgrien

[11] Patent Number: 5,251,132
[45] Date of Patent: Oct. 5, 1993

[54] CLUTCH PRESSURE CONTROL BASED ON OUTPUT SHAFT SPEED

[75] Inventor: Garth H. Bulgrien, Ephrata, Pa.

[73] Assignee: Ford New Holland, Inc., New Holland, Pa.

[21] Appl. No.: 651,700

[22] Filed: Feb. 5, 1991

[51] Int. Cl.$^5$ .............................................. F16H 5/42
[52] U.S. Cl. .................... 364/424.1; 74/866; 74/336 R; 192/0.033; 192/0.075
[58] Field of Search ........... 364/424.1; 74/866, 336 R; 192/0.032, 0.033, 0.075, 0.076

[56] References Cited

U.S. PATENT DOCUMENTS

| | | | |
|---|---|---|---|
| 4,485,443 | 11/1984 | Knödler et al. | 192/0.033 |
| 4,514,811 | 4/1985 | Daubenmier et al. | 192/0.076 |
| 4,790,418 | 12/1988 | Brown et al. | 192/0.032 |
| 4,821,190 | 4/1989 | Patil | 364/424.1 |
| 4,898,049 | 2/1990 | Niikura | 364/424.1 |
| 4,991,454 | 2/1991 | Bulgrien | 74/335 |
| 4,991,455 | 2/1991 | Bulgrien | 74/336 R |

Primary Examiner—Jack B. Harvey
Assistant Examiner—Edward Pipala
Attorney, Agent, or Firm—Griffin Butler Whisenhunt & Kurtossy

[57] ABSTRACT

In a powershift transmission system the output shaft and driveline unwind and then wind up during shifting under load as the torque applied to the shaft through a first clutch is reduced and the torque applied to the shaft through a second clutch is increased. The degree of winding or unwinding is dependent on the load being driven by the shaft and is manifested as an apparent increase or decrease in the rate of rotation of the output shaft as measured at the transmission end of the shaft. The rate of rotation of the transmission output shaft is sensed during shifting and the second clutch pressure is controlled in accordance with the sensed rate of rotation so that the second clutch pressure varies according to the load. The arrangement reduces sudden accelerations under no-load conditions but permits near optimum clutch pressures at heavier loads.

7 Claims, 4 Drawing Sheets

CLUTCH PRESSURE CONTROL BASED ON OUTPUT SHAFT SPEED

RELATED APPLICATIONS

This application is related to my copending application Ser. no. 07/610,316 filed Nov. 8, 1990 now U.S. Pat. No. 5,036,718, the disclosure of which is incorporated herein by reference.

BACKGROUND OF THE INVENTION

In tractor transmissions such as that disclosed in my above-referenced application, the clutch plate engagement pressure, hereinafter referred to as the clutch pressure, applied during shifting from one gear to the next is increased at a rate which does not take into account the load on the tractor drawbar. The rate of increase of clutch pressure is ideally set for optimum operation at full load conditions but for light or no-load conditions this causes a "jerk" or sudden acceleration. Thus, a trade-off is made. The rate of increase of clutch pressure is made lower than that required for optimum operation at full load in order to obtain a smoother acceleration at light loads. While this trade-off has been satisfactory for most shift conditions, a suitable trade-off has not been found for certain conditions such as the shift from 9th to 10th gear in the transmission disclosed in my prior application.

It is possible to tailor the shift strategy for varying load conditions by modifying the rate of clutch pressure increase in accordance with the load, but the system shown in my copending application has no load sensor. It does, however, have a speed sensor for sensing ground speed by sensing the rate of rotation of the transmission output shaft and in accordance with the present invention this speed sensor may be used to develop signals indicative of the load being pulled by the tractor.

Use of a speed sensor to obtain an indication of load is enhanced because the transmission output shaft and tractor driveline wind up or are twisted as the transmission applies torque to the shaft, and as the transmission ceases driving the shaft, the shaft and driveline unwind. The degree of winding and unwinding is dependent on the tractor load and causes an apparent ground speed variation as sensed by the ground speed sensor. This variation may thus be used to adapt the rate of increase of clutch pressure according to the load so that optimum smooth shifting is obtained for all load conditions.

SUMMARY OF THE INVENTION

An object of the present invention is to provide a novel method and apparatus for controlling clutch pressure in a transmission during shifting so that smooth acceleration is obtained regardless of the load.

An object of the present invention is to provide a novel method and apparatus for controlling the rate of change of clutch pressure during shifting in a powershift transmission.

Another object of the invention is to provide a method and apparatus for varying the rate of change of clutch pressure in a transmission during shifting, the rate of change being dependent on the load driven by the transmission.

A further object of the invention is to provide a novel method and apparatus for sensing changes in the rotational speed of a transmission output shaft during a shift operation wherein shift smoothness is controlled by clutch pressure, and in response to the sensed changes in speed controlling the rate at which the clutch pressure is increased.

It is an advantage of this invention to use a novel method of sensing changes in the rotational speed of a transmission output shaft during a shift operation wherein a first clutch pressure is reduced as a second clutch pressure is increased.

In accordance with the principles of the invention a toothed gear is mounted on the output shaft of a microprocessor-controlled transmission. A sensor senses passage of teeth on the gear and interrupts the microprocessor as each tooth is sensed. The microprocessor counts clock pulses between interrupts to develop a raw frequency value indicative of the shaft speed. At each interrupt the microprocessor also adds the raw frequency value to a multiple of a filtered frequency value and divides the sum by the multiple plus one to obtain an updated filtered frequency value. During an upshift, the microprocessor sets an adapt flag, causes an initial clutch pressure to be applied to the clutch, and sets an initial slope value, i.e. a value by which the initial clutch pressure will be incremented at fixed intervals of time. The initial clutch pressure and initial slope value are chosen to provide a clutch pressure and a rate of clutch pressure increase which are optimum for a no-load condition.

Setting of the adapt flag causes the microprocessor to enter an adaptive routine which it repeatedly executes one time for each tooth passing the sensor. During each execution of the adaptive routine a determination is made of whether the current raw frequency value differs from the current filtered frequency value by at least a dead-band value. The existence of a difference between the raw frequency and the filtered frequency values indicates that the shaft speed is changing. Any difference above the dead-band value is multiplied by a gain factor to obtain a correction value by which the clutch pressure is increased. The correction value is divided by a constant to obtain a new slope value, i.e. a new value by which the corrected clutch pressure will be increased at periodic intervals until the maximum clutch pressure is reached or until a new slope value is calculated.

Other objects, uses and advantages of the invention will become apparent upon consideration of the following description and the accompanying drawing.

DETAILED DESCRIPTION OF THE INVENTION

Figure 1:
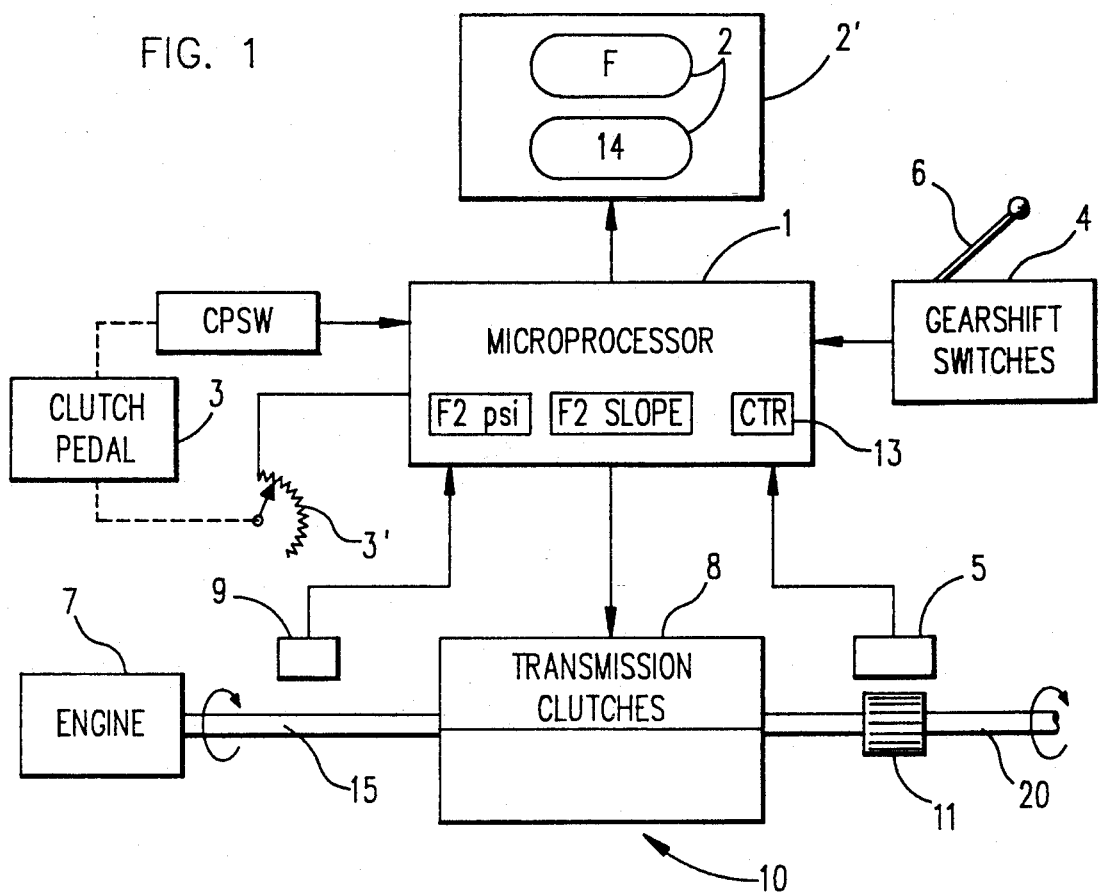
FIG. 1 is a schematic diagram of a powershift transmission system.

FIG. 1 illustrates a powershift transmission system as disclosed in my prior application. The powershift transmission system includes a microprocessor 1, a display 2 on an operator's control panel 2', a plurality of gearshift switches 4 which are selectively actuated by manually moving a gearshift lever 6, and a plurality of transmission clutches 8 associated with a transmission 10 which transmits power from a rotating power input shaft 15 to a power output or vehicle drive shaft 20. An engine 7 unidirectionally rotates shaft 15 and a sensor 9 senses rotation of shaft 15 to provide output signals indicating the speed of engine 7. A sensor 5 senses teeth on a gear 11 mounted on the shaft, and provides an output signal as each tooth is sensed, the interval of time elapsing between the sensing of two teeth being indicative of vehicle ground speed. An operator-actuated clutch pedal 3 controls a potentiometer 3' and the output signal from the potentiometer is applied to microprocessor 1 to develop modulating signals which are applied to a final set of clutches in transmission 10. The clutch pedal 3 also actuates a clutch pedal switch CPSW when the pedal is depressed to its limit of travel. The control system is admirably suited for controlling the transmission of a tractor, and is embodied in the 8030 series of tractors manufactured by Ford Motor Company but it may also be used to control the transmissions of other vehicles or machines.

The gearshift switches 4 are Hall-effect switches or similar devices which are actuated by a magnet or magnets carried on the gearshift lever 6. In response to output signals from the clutch pedal switch CPSW, the potentiometer 31, the switches 4, and the speed sensors 5 and 9, the microprocessor 1 controls transmission clutches 8 to "select gears", i.e. select the direction and rate of rotation of output shaft 20 relative to input shaft 15.

As explained in my prior application, the gearshift lever 6 is manually movable between nine positions. An operator may preselect a desired gear speed while in neutral by shifting the gearshift lever between neutral up (NUP), neutral down (NDN) and neutral (N) positions. As the gearshift lever is actuated between these positions, the microprocessor 1 causes display 2' to display the gear speed selected. After a gear speed has been selected, the operator may move the gearshift lever to the forward (F) position or the reverse (R) position and the microprocessor controls clutches 8 so that output shaft 20 is driven at a preselected gear speed ratio relative to input shaft 15. Changes in gear selection may also be made by an operator by moving the gearshift lever 6 between forward, forward up and forward down positions or between reverse, reverse up and reverse down positions. The transmission 10 has three sets of clutches as subsequently described providing eighteen forward gear speed ratios (1-18) and nine reverse gear speed ratios (4-12).

Figure 2:
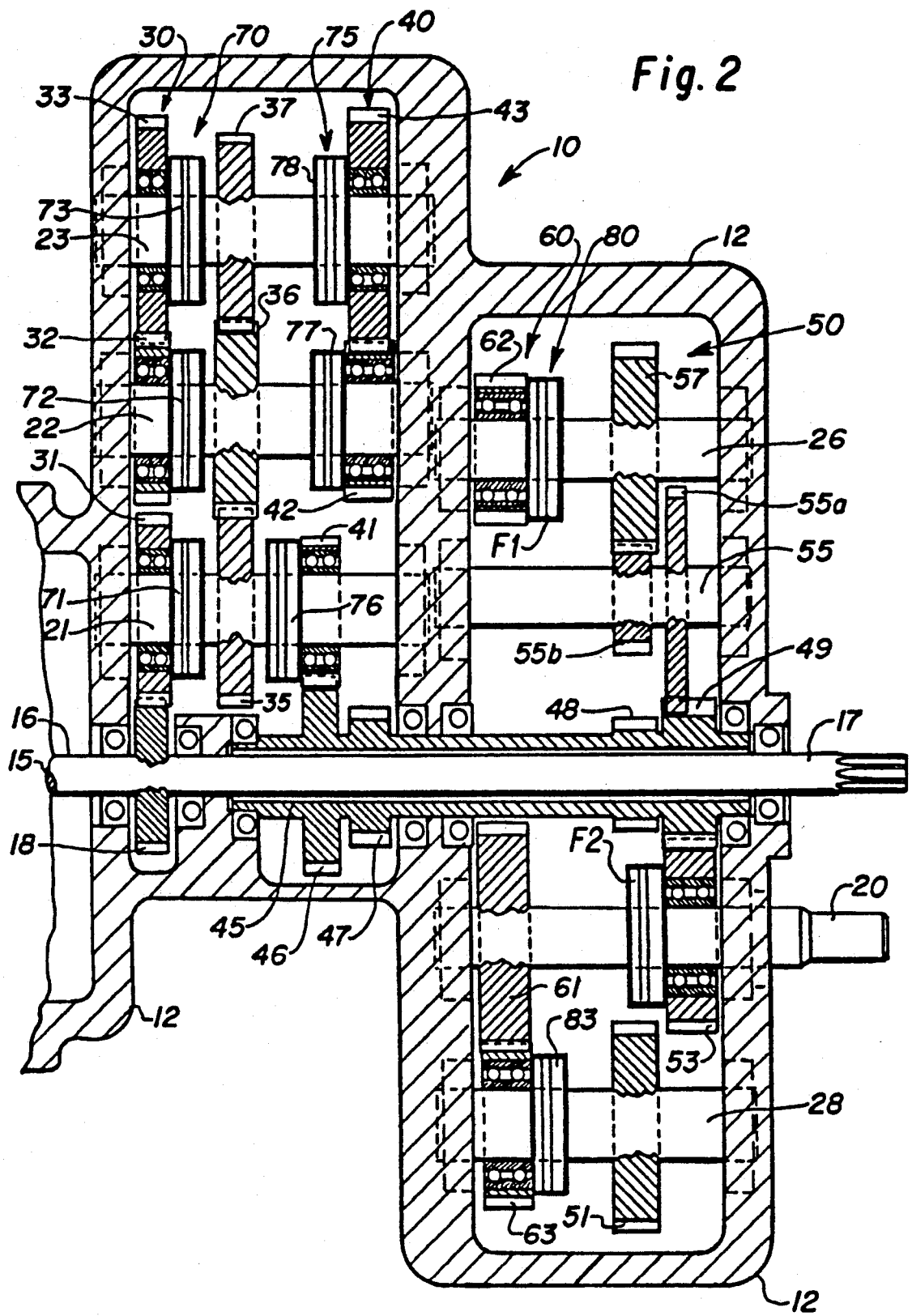
FIG. 2 is a schematic planar development of a three-dimension transmission.

FIG. 2 is a schematic planar development of the transmission 10. The transmission is fully described in my copending application. Briefly, the transmission includes an exterior casing 12 supporting the input shaft 15 and the output shaft 20. A drive pinion 18 is secured to the input shaft 15 and drives three gears 31, 32 and 33 having different sizes and mounted for free rotation about jack shafts 21, 22 and 23, respectively. Three clutches 71, 72 and 73 are mounted on jack shafts 21, 22 and 23 and three gears 35, 36 and 37 are affixed to jack shafts 21, 22 and 23, respectively. These gears are identical in size and are intermeshed. Actuation of one of the clutches 71, 72 or 73 couples drive power from one of the gears 21, 22 or 23 to one of the jack shafts and through the gears 35, 36 or 37 to the other two jack shafts so that they all rotate at the same speed, this speed being determined by which one of the clutches 71, 72 or 73 is actuated.

Three intermediate gears 41, 42 and 43 of different sizes are mounted for free rotation on shafts 21, 22 and 23, respectively, and three clutches 76, 77 and 78 are affixed to the shafts. The gears 41, 42 and 43 drive, either directly or indirectly, a transfer hub assembly 45. The transfer hub assembly is supported by bearings in casing 12 so as to rotate freely about shaft 15. When one of the clutches 76, 77 or 78 is actuated, drive power is transferred through one of gears 41, 42 or 43 to the transfer hub assembly 45. Since all three shafts 21, 22 and 23 may be driven at any one of three speed ratios depending upon which clutch 71, 72 or 73 is actuated, and since the gears 41, 42 and 43 are differently sized, the transfer hub assembly may be driven at any one of nine gear speed ratios relative to input shaft 15 by actuating one of the clutches 71, 72 and 73 and one of the clutches 76, 77 and 78.

The transfer hub assembly 45 is provided with a transfer gear 48 which drives a reverse transfer gear 51 affixed to a jack shaft 28. A reverse clutch 83 is mounted on jack shaft 28 and rotates therewith. A reverse final gear 63 rotates freely on jack shaft 28 and drives a final gear 61 which is affixed to output shaft 20. When clutch 83 is actuated, driving torque is transmitted through gear 48, gear 51, jack shaft 28, clutch 83, gear 63 and gear 61 to the output shaft 20 so that the output shaft is driven in the reverse direction at a speed proportional to the speed of the transfer hub assembly 45. Since the transfer hub assembly rotates at one of nine gear speed ratios relative to input shaft 15, as determined by which clutch 71, 72 or 73 and which clutch 76, 77 and 78 is actuated, the output shaft 20 rotates in the reverse direction at one of nine gear speed ratios relative to the input shaft.

The transfer hub assembly includes a transfer gear 49 which engages a gear 55A affixed to a jack shaft 55. A gear 55B is also affixed to shaft 55 and engages a gear 57 affixed to a jack shaft 26. A low speed final clutch F1 is mounted on shaft 26 and a gear 62 is mounted for free rotation on the shaft. Gear 62 engages gear 61 affixed to output shaft 20.

When clutch F1 is actuated, driving power is transmitted from gear 49 through gear 55A, shaft 55, gear 55B, gear 57, shaft 26, clutch F1, gear 62 and gear 61 to the output shaft 20. The output shaft is thus driven in a forward direction at a speed proportional to the speed of the transfer hub assembly 45. Since the transfer hub assembly 45 rotates at one of nine gear speed ratios relative to input shaft 15 as previously described, actuation of clutch F1 causes output shaft 20 to be rotated in a forward direction at one of nine low speed forward gear ratios relative to the input shaft.

The transfer gear 49 on transfer hub assembly 45 drives a gear 53 mounted for free rotation on output shaft 20. A high speed final clutch F2 is mounted on output shaft 20 so that when the clutch is engaged driving power is transmitted from gear 49 through gear 53 and clutch F2 to the output shaft. Since the transfer hub assembly 45 rotates at one of nine speeds relative to the input shaft 15, actuation of clutch F2 causes the output shaft 20 to be driven at one of nine high speed forward gear ratios relative to the input shaft.

Figure 3:
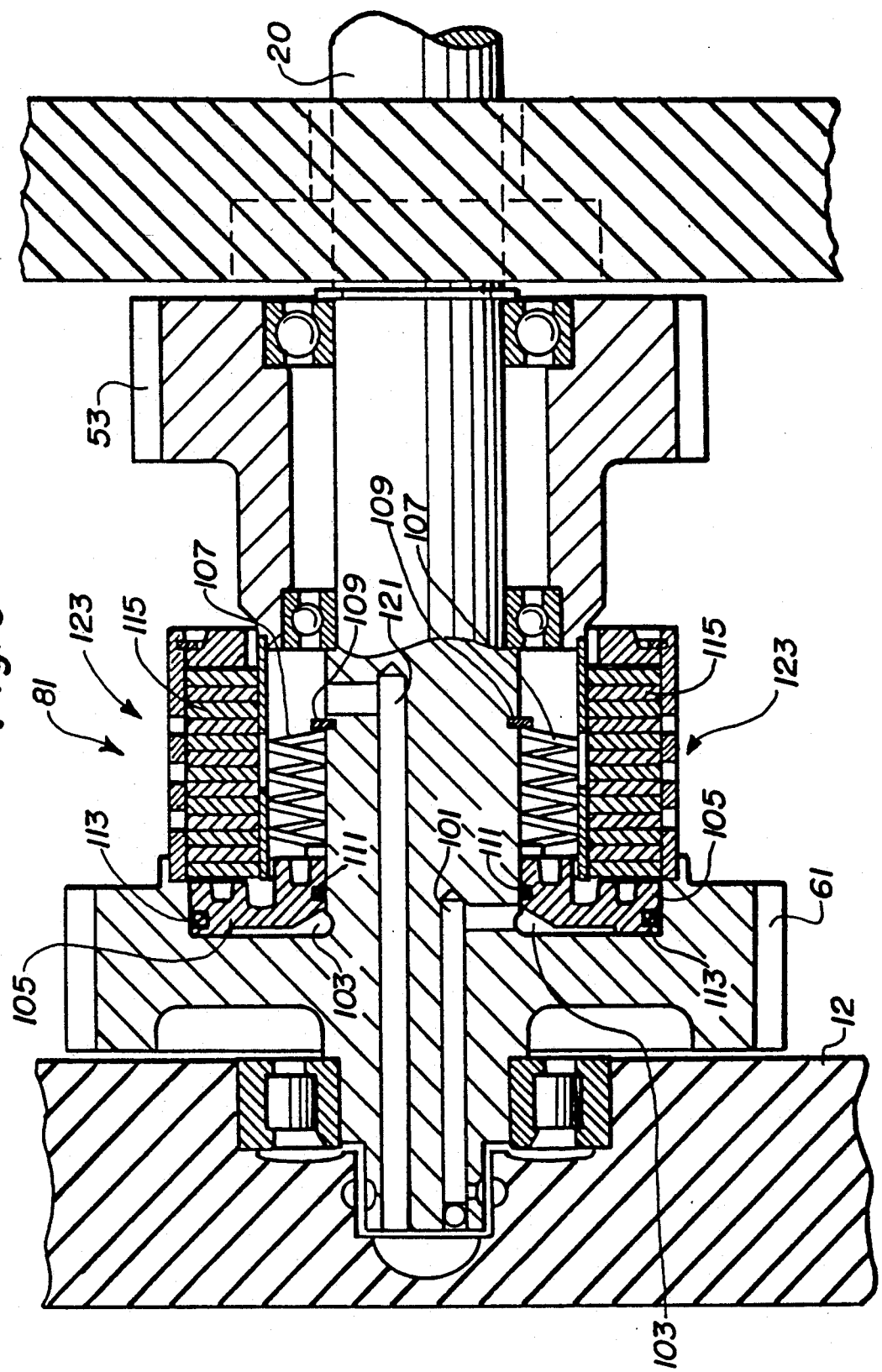
FIG. 3 is a sectional view of a fluid actuated clutch.

FIG. 3 illustrates a typical hydraulic clutch construction. The particular clutch shown is the high-speed final clutch F2 but it is typical of the clutches shown in FIG. 2. As shown in FIG. 3, clutch F2 is mounted on output shaft 20 so as to rotate therewith. A hydraulic fluid passage 101 extends through the shaft 20 to a piston cavity 103 which contains a piston 105. When a clutch actuation signal is applied to a solenoid (not shown) hydraulic fluid at a control pressure is injected through passage 101 into cavity 103. The piston 105 surrounds shaft 20 and a first ring seal ill prevents leakage of hydraulic fluid between the piston and shaft 20 while a second ring seal 113 prevents leakage of hydraulic fluid between piston 105 and gear 61.

Piston 105 is forced to the right as the pressure exerted on it by the hydraulic fluid increases. As the piston moves to the right it compresses a spring 107 which surrounds shaft 20. A ring stop 109 prevents rightward movement of the spring.

As piston 105 moves to the right it also acts against a clutch pack 115. The clutch pack includes two sets of clutch plates which surround shaft 20 outwardly of spring 107. The plates of the sets alternate in clutch pack 115 in a conventional manner with the second set being mounted so as to rotate with gear 53 and the first set being mounted so as to rotate with shaft 20.

As the piston 105 is forced to the right, the plates of the first set are forced into frictional engagement with the plates of the second set, the force or clutch pressure being dependent on the hydraulic pressure in cavity 103. The gear 53 is the input drive member for the clutch as explained with reference to FIG. 2. Thus, as the piston exerts force on the clutch pack torque is transmitted from gear 53 through the plates in clutch pack 115 to the output shaft 20. When the hydraulic pressure in cavity 103 is released, the compressed return spring 107 acts against piston 105 to move it back to the position shown in FIG. 3 so that transmission of torque through the clutch ceases.

The passage 121 receives a constant supply of lubricating oil which is forced through clutch pack 115 and exits through passages 123 into the transmission casing.

The clutches F2, F1 and 83 shown in FIG. 2 serve as inching clutches. As explained in my aforementioned application, clutches in the transmission may be calibrated after a tractor has been assembled or when the tractor is serviced. During calibration, the microprocessor stores a digital value $I_s$ where $I_{MAX} > I_s > I_{MIN}$. The digital value $I_s$ represents the magnitude of a pulse-width-modulated current signal which, when applied to a solenoid of a solenoid operated valve, allows hydraulic fluid controlled by the valve to apply to the clutch plates a pressure just less than that required to transmit torque through the clutch. A separate value $I_s$ is stored for each clutch.

$I_{MAX}$ represents the maximum current signal which may be applied to a clutch solenoid. The hydraulic pressure applied to a clutch varies inversely with respect to the current applied to the solenoid of the clutch. Thus, when a current $I = I_{MAX}$ is applied to a clutch solenoid, the lowest hydraulic pressure is applied to the clutch plates and when a current $I = I_{MIN}$ is applied to the solenoid the maximum hydraulic pressure is applied to the clutch plates.

Figure 4A:
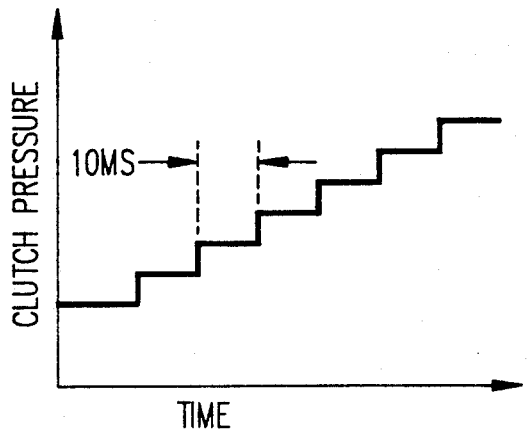
FIG. 4A is a graph of clutch pressure versus time and illustrates the manner in which clutch pressure has previously been varied during shifting.

On a shift from one gear to the next, the clutch solenoids for the clutches F1 and F2 are not actuated so as to instantaneously apply maximum clutch pressure. Instead, the modulated signal applied to a clutch solenoid is gradually varied so that the clutch pressure is increased over an interval of time as illustrated in FIG. 4A to reduce the sudden accelerations which would otherwise occur. For example, during a shift from 9th to 10th forward gear, the microprocessor 1 employs two registers, F2psi and F2SLOPE to develop pulse width modulated signals for controlling the F2 clutch pressure. At 10 millisecond intervals the contents of F2psi are modified by the contents of the register F2SLOPE and the result is then used to generate the pulse width modulated signal for controlling the F2 clutch pressure. The F2 clutch pressure is thus step increased by equal amounts every 10 milliseconds as indicated in FIG. 4A until the maximum clutch pressure is being applied.

The rate of acceleration of the tractor is dependent on the load being pulled by the tractor. That is, a given rate of increase in clutch pressure may result in a very gradual acceleration when a heavy load is being pulled but a very sudden acceleration when a light load or no load is being pulled. This difference in acceleration is particularly noticeable in the transmission of FIG. 2 when shifting from 9th to 10th gear because on this shift the clutch pressure of the low speed final clutch F1 is reduced and clutch pressure of the high speed final clutch F2 is increased.

Heretofore, the rate of increase of the F2 clutch pressure during a shift has been chosen to be less than the optimum pressure for a full load condition so that a more gradual acceleration is obtained under light or no-load conditions. In accordance with one aspect of the present invention, the rate of increase of clutch pressure, i.e. F2SLOPE is made variable according to the load being pulled. Since the system shown in FIG. 1 has no load sensor, per se, a second aspect of the invention relates to a method of determining load by sensing the rate of rotation of the output shaft of the transmission.

As shown in FIG. 1, the speed sensor 5 senses the rate of rotation of output shaft 20 by sensing teeth on a gear 11 mounted on the shaft. As each tooth is sensed, an output signal from sensor 5 interrupts the program being executed by the microprocessor 1. The microprocessor includes a counter 13 which counts clock pulses. Each time a signal from sensor 5 interrupts the microprocessor program the microprocessor calculates a frequency from the counts in the counter and stores the frequency in a storage location RAW FREQUENCY, resets the counter and sets an Update flag to indicate a new shaft speed has been entered in RAW FREQUENCY. Thus, the location RAW FREQUENCY always holds a value representing the rate of rotation of shaft 20 during the interval of time elapsing between the sensing of the last two teeth. The microprocessor also includes a register FILTERED FREQUENCY. Each time RAW FREQUENCY receives a new count, the value in FILTERED FREQUENCY is multiplied by 3 and the new contents of RAW FREQUENCY are added to the product. The result is divided by 4 and the result saved in FILTERED FREQUENCY.

The sensed rate of rotation of output shaft 20 can vary considerably during full load shifts even though the shifts may feel quite smooth. Due to the high torques involved there is considerable torsional deflection or "windup" in shaft 20 and other shafts in the driveline between the transmission 10 and the wheels of the tractor. That is, when the transmission output torque changes during a shift, the shaft 20 may make rapid but brief speed changes resulting in the unwinding and then the winding up of the driveline with little effect on ground speed. For example, as a shift is made from 9th to 10th gear the reduction of F1 clutch pressure begins before the F2 clutch pressure begins to drive the output shaft. As the F1 clutch pressure is reduced, the torque carrying capacity of F1 clutch is reduced. The drive shaft 20 (and the rest of the driveline to the wheels) begins to unwind when the torque carrying capacity of the F1 clutch is no longer sufficient to overcome the load. The extent and the rate of the unwinding depends on the load being pulled by the tractor. The unwinding of the shaft 20 is reflected at sensor 5 as an apparent decrease in ground speed. On the other hand, as the F2 clutch pressure is increased, the drive shaft 20 rewinds, the degree of rewinding again being dependent on the load being pulled. This rewinding is reflected at sensor 5 as an apparent increase in ground speed. Thus, successive counts accumulated in counter 13 may be compared during a shift and the difference taken as an indication of the load.

Figure 5:
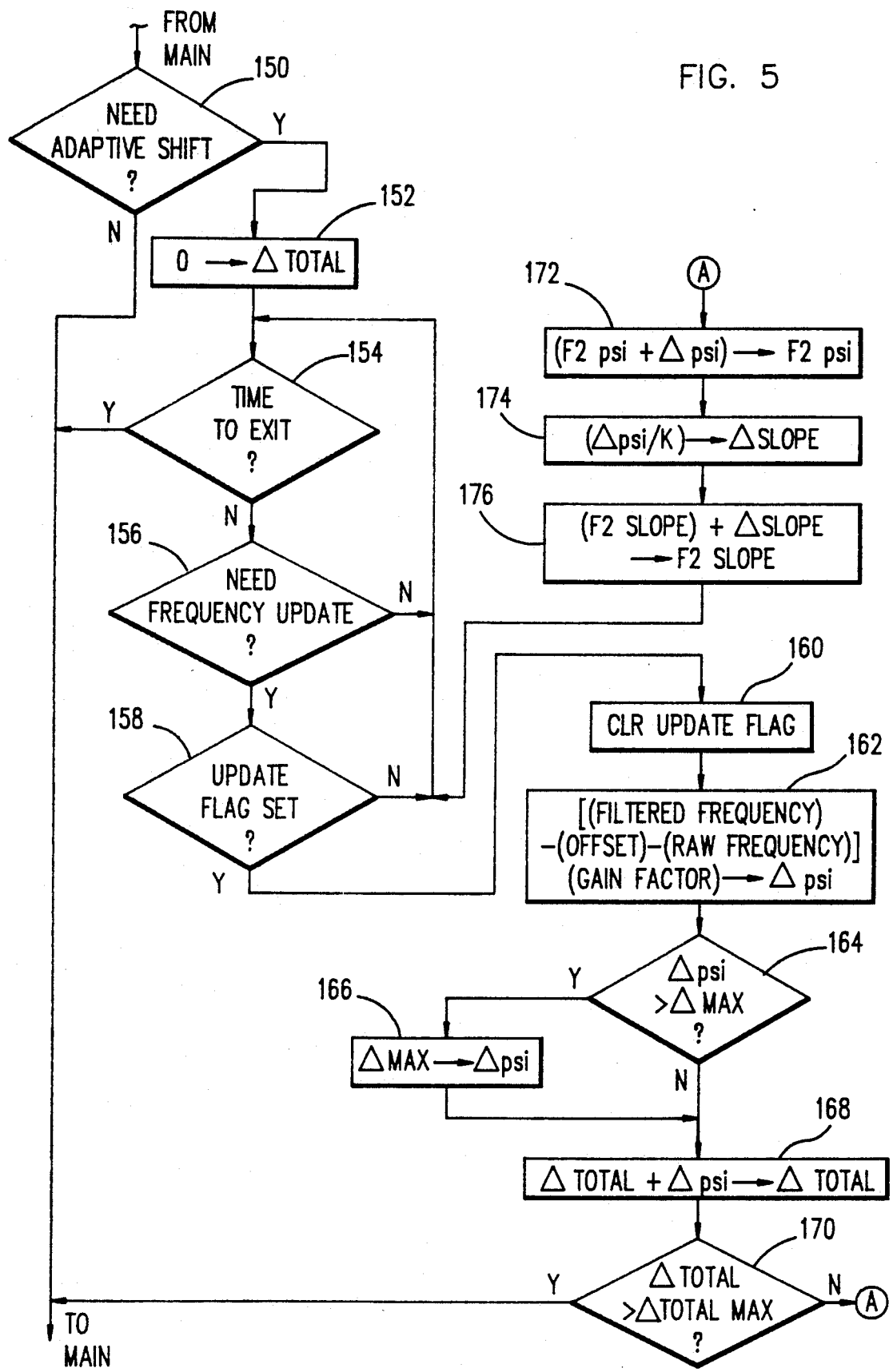

FIG. 5 illustrates an adaptive routine which is a branch of the main routine or main control loop executed by microprocessor 1. The purpose of the adaptive routine is to adjust the values F2psi and F2SLOPE which control the pressure applied to the high speed final clutch F2 during a shift from 9th to 10th forward gear. The microprocessor 1 repeatedly executes the main control loop during which it senses gearshift switches 4 to determine what operation is commanded by the position of gearshift lever 6, and performs various other functions such as determining the need to perform various operations. Step 150 shown in FIG. 5 is one step performed during execution of the main control loop. It should be understood that the main control loop is interrupted each time sensor 5 senses a gear tooth. Furthermore, the main control loop is interrupted at 10 ms intervals to process "events" and to update the signals applied to the clutch solenoids to set the clutch pressure. An event comprises one or more steps such as setting a flag, loading a register, initiating energization of a clutch solenoid, etc. Several events may be executed at intervals of 10 ms or multiples thereof in order to carry out the operations required by a single shift command.

Assume that the tractor is moving forward with transmission 10 in 9th gear and the operator moves gearshift lever 6 to the forward up position to command a shift to 10th gear. The microprocessor senses the command during execution of the main control loop and within 10 ms the main control loop is interrupted to process a first event associated with the command to shift from 9th to 10th gear. Actually, the main control loop is interrupted several times at 10 ms intervals or multiples thereof to perform several functions not relevant to the present invention. These functions include, for example, applying signals to the valves controlling clutch F2 so as to insure that the chamber 103 thereof is filled with oil and the F2 clutch pressure is at a value just below the pressure required to transmit torque through the clutch, and changing the signals applied to the F1 clutch solenoid so that the F1 clutch pressure begins to decrease. After events are executed to initiate these functions, an event is executed which sets a code into a register ADAPT, the code indicating that the adaptive routine of FIG. 5 must be executed. Execution of this event also sets a value in the register F2SLOPE, which is used to modify F2psi at 10 ms intervals and the modified value is used to set the F2 clutch pressure. The values of F2psi and F2SLOPE at the initiation of the adaptive routine are chosen so as to provide a smooth shift from 9th to 10th gear under a no-load condition.

Upon return to the main control loop after execution of the event which sets the ADAPT register, the main control loop is executed until step 150 is reached. The test at step 150 shows that the code in ADAPT is one of many possible codes requiring execution of the adapt routine so the program branches to step 152 where a register ΔTOTAL is cleared. This register is used to accumulate a total of clutch pressure changes as subsequently described.

At step 154 the ADAPT register is checked to see if it contains a code calling for ending the adapt routine. Since the register stills holds the code calling for execution of the adaptive routine the test proves false and the program moves to step 156.

The F1 clutch pressure is still being reduced and the F2 clutch pressure is not high enough to begin transmitting torque. If the transmission is under load, and transmitting torque, the F1 clutch will begin to slip while the microprocessor is executing the adaptive routine. Thus, the shaft 20 and driveline will unwind so that sensor 5 will produce output signals at a slower rate depending on the load. The register FILTERED FREQUENCY holds a filtered or average value of the rate of rotation of shaft 20 and the register RAW FREQUENCY holds a value indicative of the rate of rotation of the shaft at the time the last tooth was sensed by sensor 5. If the output shaft is decelerating, the value of RAW FREQUENCY is lower than the value of FILTERED FREQUENCY. The purpose of step 156 is to determine if the rate of rotation of shaft 20 is decreasing sufficiently to require correction of F2psi and F2SLOPE.

The test at step 156 is carried out by subtracting a value OFFSET from the value in the register FILTERED FREQUENCY and comparing the result with the value in the register RAW FREQUENCY. The value OFFSET is a "dead-band" value. That is, the latest or raw frequency must be less than the filtered frequency by at least the value OFFSET before the adaptive routine is permitted to modify the values in F2psi and F2SLOPE.

If the test at step 156 proves false, the routine branches back to step 154 and repeats steps 154 and 156. If the test at step 156 proves true then the frequency update flag is tested at step 158. This flag is set each time sensor 5 senses a tooth and the calculated frequency is transferred to the register RAW FREQUENCY. Step 158 permits the F2psi and F2SLOPE to be modified only once for each time a value is transferred to the register RAW FREQUENCY.

If the test at step 158 shows that the Update flag is not set it means that there is no new input data for the routine process so the program branches back to step 154. If the update flag is set, there is new data in the RAW FREQUENCY register which may be used to update F2psi and F2SLOPE. The update flag is cleared at step 160.

At step 162, the value Δpsi is calculated. The value in OFFSET is subtracted from the value in FILTERED FREQUENCY and the value in RAW FREQUENCY is subtracted from the result. This gives a resulting value indirectly representing the load being pulled by the tractor. The resulting value is then multiplied by a gain factor to convert it to a useful clutch pressure control value which is then stored in a register Δpsi.

At step 164 Δpsi is compared with a value ΔMAX representing the maximum allowed value of Δpsi for control purposes. If the test at step 164 shows that Δpsi is less than ΔMAX the program moves directly to step 168. On the other hand, if the test at step 164 shows that Δpsi is greater than ΔMAX then ΔMAX is loaded into Δpsi at step 166 before proceeding to step 168. This provides an upper limit on the increase in F2psi per tooth passing the sensor.

At step 168 the contents of Δpsi are added to the contents of ΔTOTAL and the result is saved in ΔTOTAL. At step 170 ΔTOTAL is compared with a value ΔTOTAL MAX representing the maximum total increase in F2psi which is permitted. If the test at step 170 proves true, neither F2psi nor F2SLOPE is modified. The routine branches back to the next step of the main control loop.

Assuming ΔTOTAL does not exceed ΔTOTAL MAX, the program moves to step 172 where the value in Δpsi calculated at step 162, or modified at step 166, is added to the value in F2psi. At step 174 Δpsi is divided by a constant K to obtain a slope value which is stored in register ΔSLOPE. At step 176 ΔSLOPE is added to F2SLOPE and the result is saved at F2SLOPE. The program then returns to step 154 to repeat the adaptive routine. Meanwhile, the new value in F2psi is used to control the F2 clutch pressure.

The routine between steps 154 and 176 may be repeated several times before it (i.e. the main routine of which it is a branch) is again interrupted to execute the next event. Between interrupts, the adaptive routine is executed one time for each tooth sensed on gear 11. Each time the adaptive routine is executed F2psi and F2SLOPE are updated and the new value in F2psi is used to control the clutch pressure. An updated value in F2SLOPE may or may not modify F2psi since this takes place at 10 ms intervals whereas the adaptive routine is executed every 1.25-2 ms depending on the output shaft speed. Several event interrupts occur to carry out operations not essential to the present invention. During this time the F1 clutch pressure is being reduced until it no longer is transferring torque to the output shaft and the F2 clutch pressure is being increased so that it begins transferring torque. As the F2 clutch torque is transmitted to output shaft 20, the shaft and driveline begin to wind up. This causes the sensor 5 to output signals at a faster rate so that increasingly larger values are entered into the register RAW FREQUENCY. At some point the difference between RAW FREQUENCY and FILTERED FREQUENCY will be less than OFFSET. This will be detected at step 156 so that only steps 154 and 156 of the adaptive routine are executed.

Near the end of the shift, after the adaptive routine has had time to make any necessary adjustments to F2psi and F2SLOPE, an event interrupt takes place during which the ADAPT register is loaded with an "end" code. Upon return to the adaptive routine after this interrupt, the end code is sensed at step 154 and the adaptive routine branches back to the next step of the main control loop. However, the last value entered in F2psi is modified by the last value entered in F2SLOPE at 10 ms intervals until the F2 clutch pressure reaches a maximum value. These modifications are controlled from the main control loop as previously described.

Comparing the prior method of applying clutch pressure (FIG. 4A) with the method of the invention, it is seen that in the prior method the clutch pressure is incremented in equal steps i.e. ΔF2SLOPE remains constant. If ΔF2SLOPE is chosen for optimum conditions at full load, there would be sudden acceleration of the tractor during shifting if the tractor load is light. On the other hand, if ΔF2SLOPE is made small to provide smooth accelerations under light loads, the clutch pressure will be too low for heavy load conditions and the clutch will initially slip, causing slow response and clutch wear.

Figure 4B:
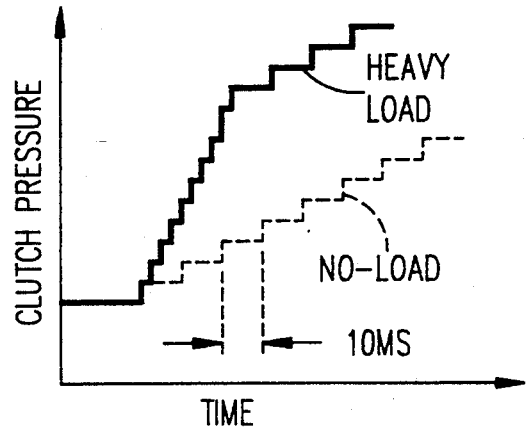
FIG. 4B is a graph of clutch pressure versus time and illustrates the manner in which clutch pressure is varied in accordance with the present invention; and, FIG. 5 illustrates an adaptive routine executed by a microprocessor to control changes in the rate of increase of clutch pressure in accordance with the load.

In my improved method, the initial clutch pressure F2psi and F2SLOPE are set for minimum load conditions and F2psi and F2SLOPE are increased according to the load. This is illustrated in FIG. 4B where the solid line indicates the clutch pressure vs. time for a heavy load condition and the broken line indicates clutch pressure vs. time for a lighter or no-load condition. With regard to the no-load curve, it should be noted that the step increases in clutch pressure have a smaller magnitude than the step increases of FIG. 4A hence a slower or smoother acceleration is obtained.

While the invention has been described in the environment of a specific transmission, it will be understood that the invention may be used with other transmissions, and various modifications and substitutions may be made in the described embodiment without departing from the spirit and scope of the invention as defined by the appended claims. For example, if the output shaft speed is high, the program may be set up to execute the adaptive routine only once for every N teeth sensed by sensor 5, N being an integer greater than 1.

I claim.

1. In a powershift transmission having an output shaft for driving a load and first and second clutches for transmitting torque to the output shaft, said transmission being shiftable from a first gear to a second gear by decreasing the first clutch pressure and increasing the second clutch pressure, a method of controlling said second clutch pressure during shifting from said first gear to said second gear, said method comprising:
   applying an initial clutch pressure to the second clutch;
   establishing a clutch pressure slope value representing a fixed increment by which the pressure applied to the second clutch may be incremented;
   repeatedly determined the speed of the output shaft;
   determining when the speed of the output shaft is decreasing during the shift,
   when the speed of the output shaft is decreasing,
      generating pressure change signals having magnitudes dependent on the change in the output shaft speed, and,
      increasing the clutch pressure slope value and the pressure applied to the second clutch in accordance with the generated pressure change signals; and,
   when the speed of the output shaft it not decreasing during the shift, incrementing the second clutch pressure in accordance with the clutch pressure slope value at fixed intervals of time.

2. A method as claimed in claim 1 wherein the pressure change signals are each divided by a constant and the result added to the clutch pressure slope value.

3. A method as claimed in claim 1 wherein the pressure change signals are limited to a predetermined maximum value.

4. A method as claimed in claim 3 wherein the pressure change signals are accumulated and the increasing of the clutch pressure slope value and the pressure applied to the second clutch is terminated for the remainder of the shift when the total of the pressure change signals exceeds a predetermined limit.

5. The method as claimed in claim 1 wherein the step of determining when the speed of the output shaft is decreasing comprises sensing successive gear teeth carried by the output shaft, determining the intervals of time between the sensing of a pair of teeth as the output shaft rotates, and comparing the interval of time between the sensing of the last pair of teeth with an average of the intervals of time between the sensing of preceding pairs of teeth.

6. The method as claimed in claim 5 wherein an offset value is subtracted from said average before said comparing takes place.

7. In a powder shift transmission having an output shaft for driving a load and first and second clutches for transmitting torque to the output shaft, said transmission being shiftable from a first gear to a second gear by decreasing the first clutch pressure and increasing the second clutch pressure, apparatus for controlling said second clutch pressure during shifting from said first gear to said second gear, said apparatus comprising:

first means for applying an initial clutch pressure to the second clutch;

storage means for storing a clutch pressure slope value representing a fixed increment by which the pressure applied to the second clutch may be incremented;

second means for repeatedly determining the speed of the output shaft;

third means for determining when the speed of the output shaft is decreasing during the shift, fourth means response to said third means when the speed of the output shaft is decreasing for generating pressure change signals having magnitudes dependent on the change in the output shaft speed, and, fifth means response to said pressure change signals for increasing the clutch pressure slope value and the pressure applied to the second clutch in accordance with the generated pressure change signals, and, sixth means responsive to said third means for incrementing the second clutch pressure in accordance with the clutch pressure slope value at fixed intervals of time when the speed of the output shaft is not decreasing during the shift.

* * * * *